United States Patent
Fallahmohammadi et al.

(10) Patent No.: US 10,884,213 B1
(45) Date of Patent: Jan. 5, 2021

(54) OPTICAL-FIBER RIBBON WITH DISTORTED SINUSOIDAL ADHESIVE PATTERN AND METHOD THEREFOR

(71) Applicant: Prysmian S.p.A., Milan (IT)

(72) Inventors: Ehsan Fallahmohammadi, Columbia, SC (US); Brian G. Risch, Granite Falls, NC (US); Clint Nicholaus Anderson, West Columbia, SC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/683,827

(22) Filed: Nov. 14, 2019

(51) Int. Cl.
*G02B 6/44* (2006.01)
*C03C 25/1065* (2018.01)

(52) U.S. Cl.
CPC .......... *G02B 6/448* (2013.01); *C03C 25/1065* (2013.01); *G02B 6/4403* (2013.01)

(58) Field of Classification Search
CPC .... G02B 6/448; G02B 6/4403; C03C 25/1065
See application file for complete search history.

(56) References Cited

U.S. PATENT DOCUMENTS

| | | | |
|---|---|---|---|
| 5,682,454 A | 10/1997 | Gaillard | |
| 5,720,908 A | 2/1998 | Gaillard | |
| 6,381,390 B1 | 4/2002 | Hutton et al. | |
| 6,584,257 B1 * | 6/2003 | Hurley | G02B 6/4471 385/109 |
| 7,623,747 B2 | 11/2009 | de Montmorillon et al. | |
| 7,889,960 B2 | 2/2011 | de Montmorillon et al. | |
| 7,995,889 B2 * | 8/2011 | de Montmorillon | C03B 37/018 385/124 |
| 8,131,125 B2 * | 3/2012 | de Montmorillon | G02B 6/0365 385/127 |
| 8,145,025 B2 | 3/2012 | de Montmorillon et al. | |
| 8,145,027 B2 * | 3/2012 | Overton | C03C 25/105 385/128 |
| 8,265,442 B2 | 9/2012 | Overton | |
| 8,385,705 B2 * | 2/2013 | Overton | G02B 6/02395 385/128 |
| 8,428,414 B2 * | 4/2013 | de Montmorillon | G02B 6/0365 385/127 |

(Continued)

FOREIGN PATENT DOCUMENTS

EP 1043613 A1 10/2000
EP 2770357 A1 8/2014

(Continued)

OTHER PUBLICATIONS

Loctite Technical Data Sheet, "Loctite 3341", www.henkel.com/industrial, Oct. 2005, pp. 1-4.

(Continued)

*Primary Examiner* — Andrew Jordan
(74) *Attorney, Agent, or Firm* — Additon, Higgins & Pendleton, P.A.

(57) ABSTRACT

A method of producing an optical-fiber ribbon includes applying bonding material to a major surface of an optical-fiber assembly via a dispenser that is revolving around a central axis to bond adjacent optical fibers in the optical-fiber assembly. The method, which facilitates faster line speeds, achieves an optical-fiber ribbon with an adhesive bead that forms a distorted sinusoidal pattern substantially across the width of the optical-fiber assembly.

22 Claims, 5 Drawing Sheets

(56) References Cited

U.S. PATENT DOCUMENTS

| | | | |
|---|---|---|---|
| 8,467,647 B2* | 6/2013 | Wells | G02B 6/4403 385/114 |
| 8,548,294 B2* | 10/2013 | Toge | G02B 6/441 385/114 |
| 8,600,206 B2 | 12/2013 | Overton | |
| 8,837,889 B2* | 9/2014 | de Montmorillon | C03B 37/018 385/124 |
| 9,086,555 B2 | 7/2015 | Namazue et al. | |
| 9,110,265 B2* | 8/2015 | Wells | G02B 6/4403 |
| 9,244,220 B2* | 1/2016 | Overton | G02B 6/02395 |
| 9,389,386 B2 | 7/2016 | Matsuzawa et al. | |
| 9,880,368 B2* | 1/2018 | Debban | G02B 6/4403 |
| 9,995,896 B2* | 6/2018 | Namazue | G02B 6/2551 |
| 10,078,194 B2* | 9/2018 | Sajima | G02B 6/448 |
| 10,185,105 B2 | 1/2019 | Risch et al. | |
| 10,185,110 B2* | 1/2019 | Kaneko | G02B 6/4403 |
| 2003/0118301 A1 | 6/2003 | Hurley et al. | |
| 2007/0127878 A1* | 6/2007 | Demontmorillon | C03B 37/018 385/124 |
| 2009/0175583 A1* | 7/2009 | Overton | C03C 25/105 385/100 |
| 2009/0279835 A1* | 11/2009 | de Montmorillon | G02B 6/0365 385/127 |
| 2009/0279836 A1* | 11/2009 | de Montmorillon | G02B 6/0365 385/127 |
| 2010/0067859 A1* | 3/2010 | De Montmorillon | C03B 37/018 385/124 |
| 2010/0119202 A1* | 5/2010 | Overton | G02B 6/02395 385/141 |
| 2010/0290781 A1* | 11/2010 | Overton | G02B 6/02395 398/43 |
| 2011/0058779 A1 | 3/2011 | Wells et al. | |
| 2011/0110635 A1 | 5/2011 | Toge et al. | |
| 2011/0135264 A1* | 6/2011 | de Montmorillon | G02B 6/0365 385/127 |
| 2011/0286710 A1* | 11/2011 | de Montmorillon | C03B 37/018 385/124 |
| 2012/0183268 A1* | 7/2012 | de Montmorillon | G02B 6/0365 385/124 |
| 2012/0189258 A1* | 7/2012 | Overton | C03C 13/046 385/124 |
| 2013/0084146 A1* | 4/2013 | Speller | B42C 9/0006 412/37 |
| 2013/0156390 A1 | 6/2013 | Matsuzawa et al. | |
| 2013/0279866 A1* | 10/2013 | Wells | G02B 6/4403 385/114 |
| 2014/0086548 A1* | 3/2014 | Overton | C03C 25/106 385/141 |
| 2014/0112631 A1* | 4/2014 | Namazue | G02B 6/44 385/114 |
| 2016/0161692 A1 | 6/2016 | Namazue et al. | |
| 2016/0299310 A1 | 10/2016 | Kaneko et al. | |
| 2016/0356976 A1 | 12/2016 | Sajima et al. | |
| 2017/0115461 A1 | 4/2017 | Namazue et al. | |
| 2017/0184803 A1 | 6/2017 | Namazue et al. | |
| 2017/0219790 A1 | 8/2017 | Debban et al. | |
| 2017/0219792 A1 | 8/2017 | Debban et al. | |
| 2018/0031792 A1 | 2/2018 | Risch et al. | |
| 2018/0371298 A1 | 12/2018 | Schmid et al. | |
| 2019/0250347 A1 | 8/2019 | Fallahmohammadi et al. | |
| 2020/0218020 A1* | 7/2020 | Namazue | G02B 6/443 |

FOREIGN PATENT DOCUMENTS

| | | |
|---|---|---|
| FR | 2693560 A1 | 1/1994 |
| JP | 2010-44336 A | 2/2010 |
| JP | 2011-221199 A | 11/2011 |
| JP | 2012-027130 A | 2/2012 |
| JP | 2012-103341 A | 5/2012 |
| JP | 2015-021734 A | 2/2015 |
| JP | 2015-108756 A1 | 6/2015 |
| JP | 2016-075746 A | 5/2016 |
| JP | 2017-134360 A | 8/2017 |
| JP | 2017-181513 A | 10/2017 |
| WO | 2012/023508 A1 | 2/2012 |
| WO | 2012/165371 A1 | 12/2012 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |

OTHER PUBLICATIONS

DSM Product Data Sheet, "Cableite 9D9-287", Mar. 2007, www.dsmdesotech.com, pp. 1-2.
DSM Product Data Sheet, "Cableite 9D9-464", (no date) pp. 1.
DSM Product Data Sheet, "Cableite 9D9-518", Mar. 2007, Elgin, IL, pp. 1-3.
Loctite Technical Data Sheet, "Loctite SI 5240", www.henkel.com/industrial, Jan. 2015, pp. 1-4.

* cited by examiner

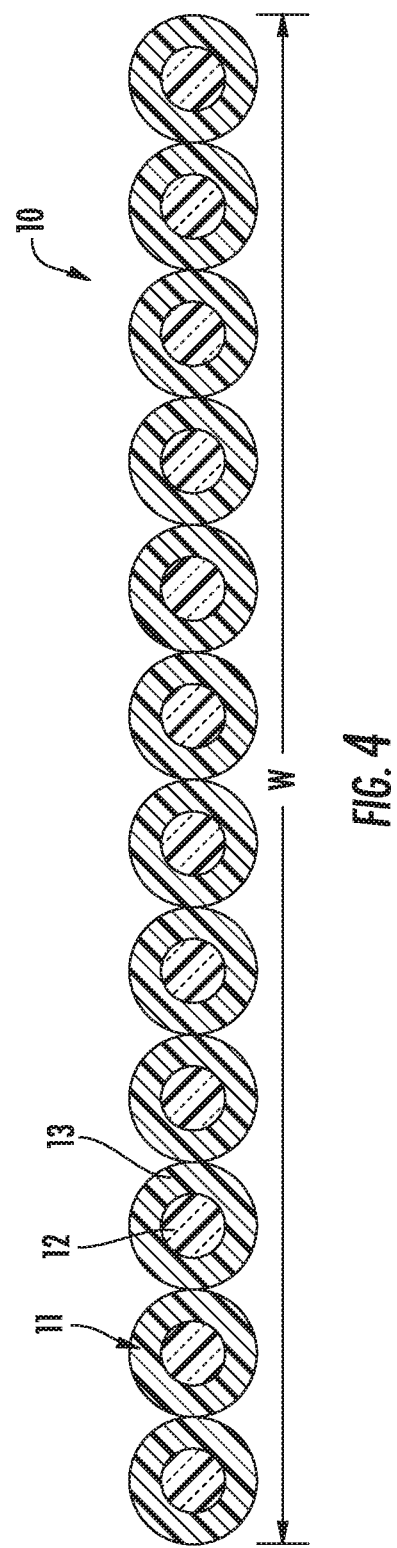

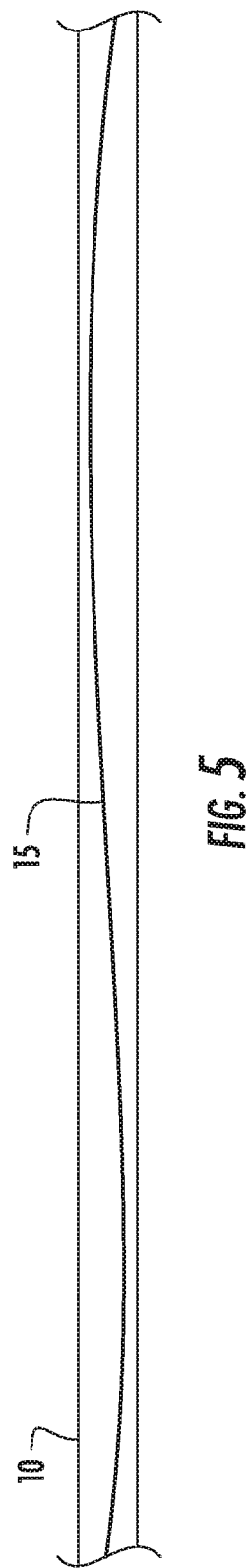

OPTICAL-FIBER RIBBON WITH DISTORTED SINUSOIDAL ADHESIVE PATTERN AND METHOD THEREFOR

FIELD OF THE INVENTION

The present invention relates to optical-fiber ribbons and methods for producing optical-fiber ribbons.

BACKGROUND

Optical fibers provide advantages over conventional communication lines. As compared with traditional wire-based networks, optical-fiber communication networks can transmit significantly more information at significantly higher speeds. The amount of data transmitted over optical fiber cables is continuously increasing worldwide. This is especially so in data centers because of the expansion of cloud computing, which requires that data be received and transmitted in limited physical space. As such, there is an increasing demand for high-fiber-count and high-fiber-density optical cables. Moreover, there is persistent desire to reduce construction costs of access cable networks, making the reduction of optical-cable diameter and weight central to the use of existing facilities (e.g., underground ducts) to reduce installation costs. Another practical requirement is the ability to mass-fusion splice optical fibers to shorten the time required for connecting cables. This means that there are several—possibly conflicting—demands, such as decreasing optical-cable diameters, increasing optical-fiber density, and improving optical-cable workability. This is a serious and difficult challenge for optical-cable manufacturers.

To achieve easy workability, optical-fiber ribbons can preferentially be mass-fusion spliced to simultaneously make multiple optical-fiber connections. Conventional optical-fiber ribbons have the disadvantage of rigidity, however, because of the application of a resin layer around the optical-fiber assembly to keep the optical fibers in a parallel plane. This rigidity limits the possibility of increasing fiber density in optical-fiber cables.

SUMMARY

Accordingly, in one aspect, the present invention embraces a method of making a flexible optical-fiber ribbon. An exemplary method includes (i) arranging a plurality of optical fibers into a longitudinal optical-fiber assembly having width w, wherein the plurality of optical fibers are parallel and respectively adjacent to each other; (ii) advancing the longitudinal optical-fiber assembly at linear velocity v; and (iii) applying bonding material to a surface of the optical-fiber assembly via a dispenser that is revolving around a central axis at a cyclical frequency r.

In another aspect, the present invention embraces an optical-fiber ribbon that includes a plurality of respectively adjacent optical fibers extending in a longitudinal direction and arranged in parallel to form an optical-fiber assembly. An adhesive bead bonds adjacent optical fibers in the optical-fiber assembly, the adhesive bead forming a distorted sinusoidal pattern substantially across the width of the optical-fiber assembly. The distorted sinusoidal pattern usually repeats itself along the length of the optical-fiber assembly. Typically, the adhesive bead's distorted sinusoidal pattern repeatedly forms (i) peaks at one edge portion of the optical-fiber assembly and (ii) valleys at an opposite edge portion of the optical-fiber assembly, the distorted sinusoidal peaks and the distorted sinusoidal valleys having different respective shapes.

Exemplary optical-fiber ribbons have excellent flexibility, strength, and robustness to facilitate rolling or folding of the constituent optical fibers in the ribbon-width direction. In addition, exemplary optical-fiber ribbons can be mass-fusion spliced to make multiple optical-fiber connections, and individual optical fibers can be separated without damaging adjacent optical fibers. Each optical fiber typically includes, from its center to its periphery, a glass core, a glass cladding, and one or more coatings (e.g., a primary coating, a secondary coating, and an optional ink layer). As such, corresponding embodiments of the optical-fiber ribbon herein disclosed are applicable to the related method for making an optical-fiber ribbon, and vice versa.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

FIG. 4 depicts in a cross-sectional view a representative optical-fiber assembly.

FIG. 5 depicts in a top view an exemplary embodiment of an optical-fiber ribbon having an adhesive bead forming a distorted sinusoidal pattern substantially across the width of the optical-fiber assembly.

DETAILED DESCRIPTION

Various aspects and features are herein described with reference to the accompanying figures. Details are set forth to provide a thorough understanding of the present disclosure. It will be apparent, however, to those having ordinary skill in the art that the disclosed optical-fiber ribbons and methods for producing optical-fiber ribbons may be practiced or performed without some or all of these specific details. As another example, features disclosed as part of one embodiment can be used in another embodiment to yield a further embodiment. Sometimes, well-known aspects have not been described in detail to avoid unnecessarily obscuring the present disclosure. This detailed description is therefore not to be taken in a limiting sense, and it is intended that other embodiments are within the spirit and scope of the present disclosure.

In a first aspect, the invention embraces a method of producing an optical-fiber ribbon. The method facilitates faster line speeds during the manufacturing of optical-fiber ribbons.

Figure 1:
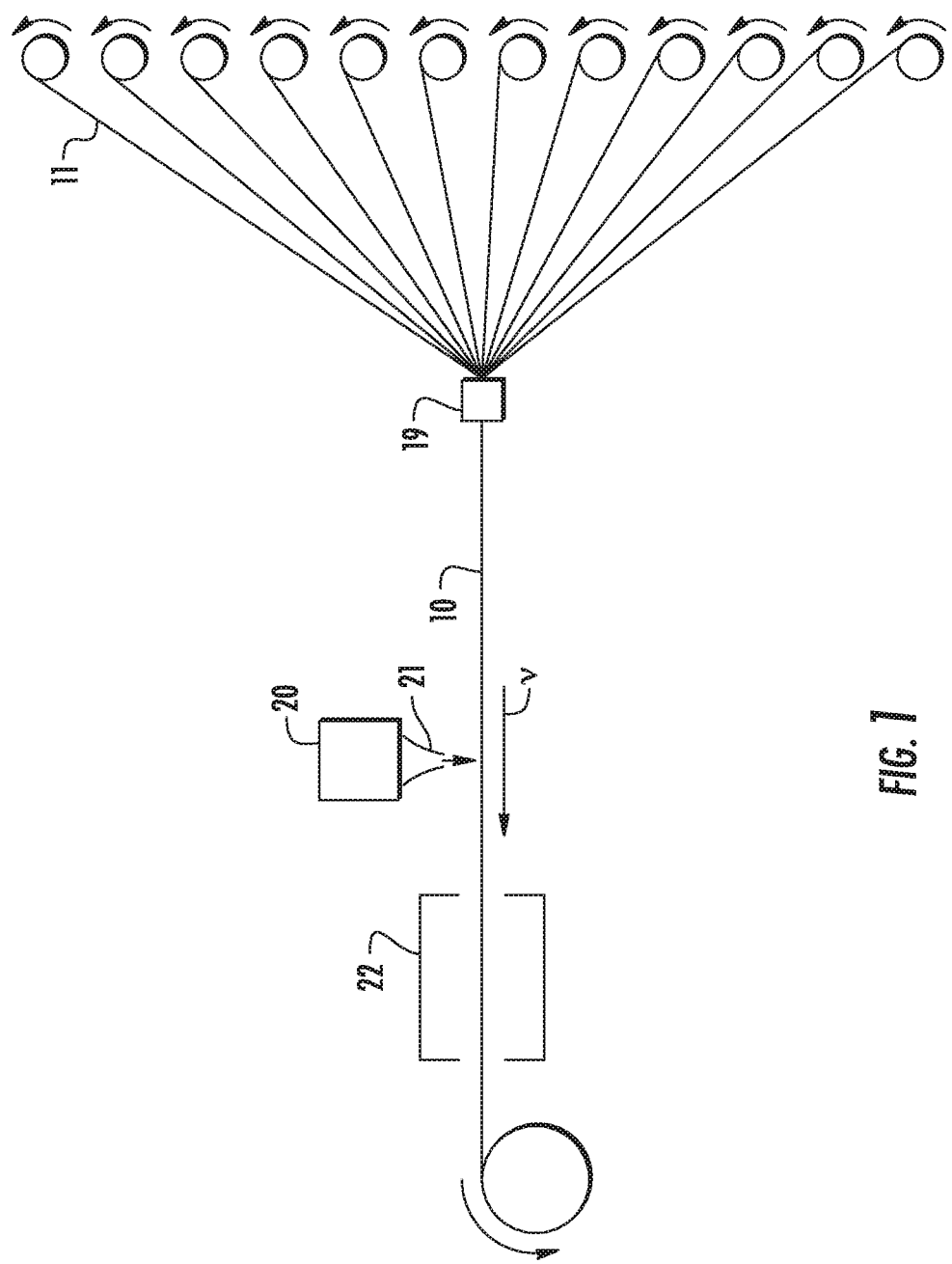
FIG. 1 depicts in a schematic representation an exemplary process for making an optical-fiber ribbon having twelve optical fibers.
Figure 2:
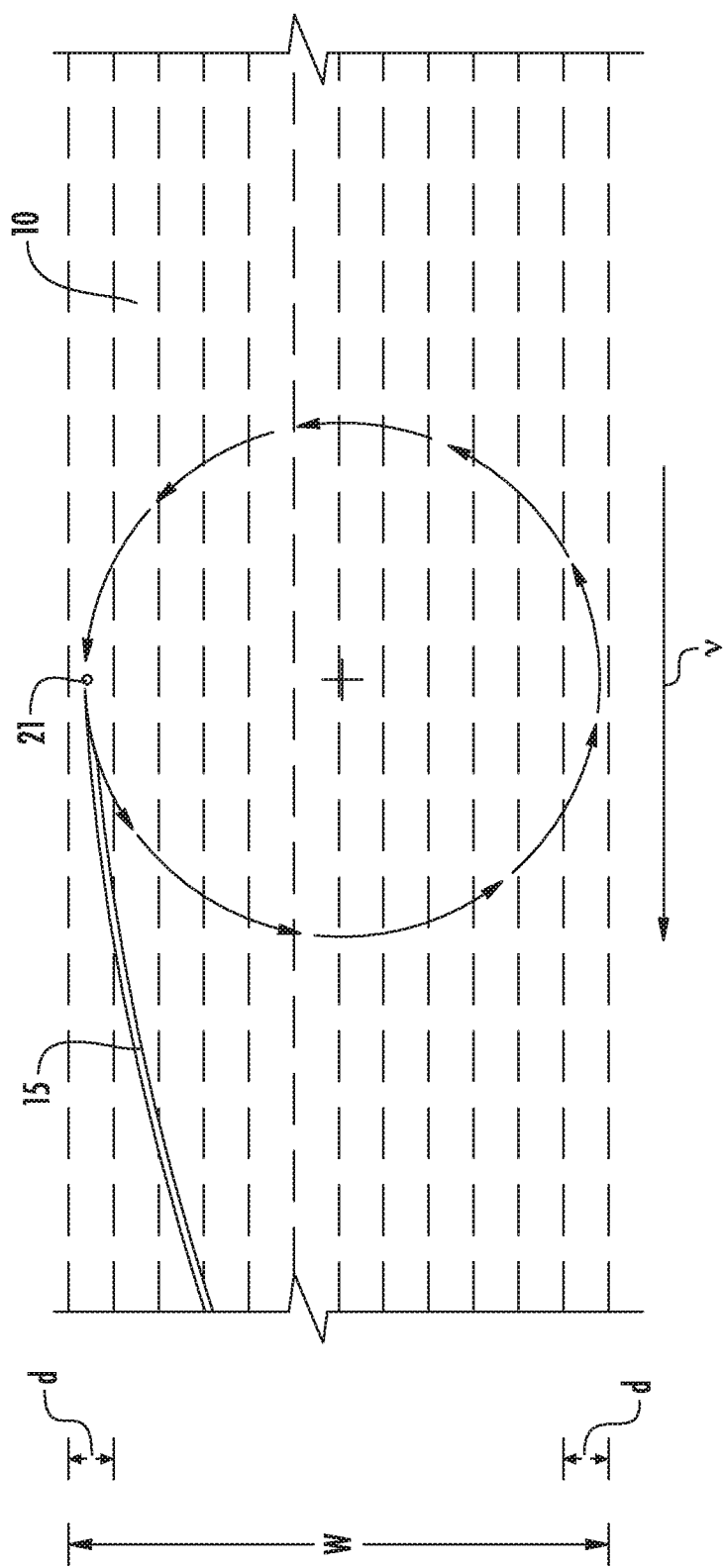
FIG. 2 depicts in a top schematic view an exemplary process for making an optical-fiber ribbon having twelve optical fibers.

As shown in the process schematic depicted in FIGS. 1-2, a plurality of optical fibers (e.g., 12 or 24 optical fibers) are arranged into a longitudinal optical-fiber assembly 10. For example, a plurality of optical fibers 11 are introduced (e.g., fed into a die 19) to provide a longitudinal optical-fiber assembly 10 in which the plurality of optical fibers 11 are substantially in parallel and respectively adjacent to each other. Typically, the longitudinal optical-fiber assembly 10 is a loose arrangement of substantially parallel optical fibers with no bonding between the fibers and having interstices or grooves between adjacent optical fibers. When employing an aggregating die 19 to align the optical fibers, the entry speed of the loose optical fibers is the same as the exit speed of the longitudinal optical-fiber assembly.

Figure 3:
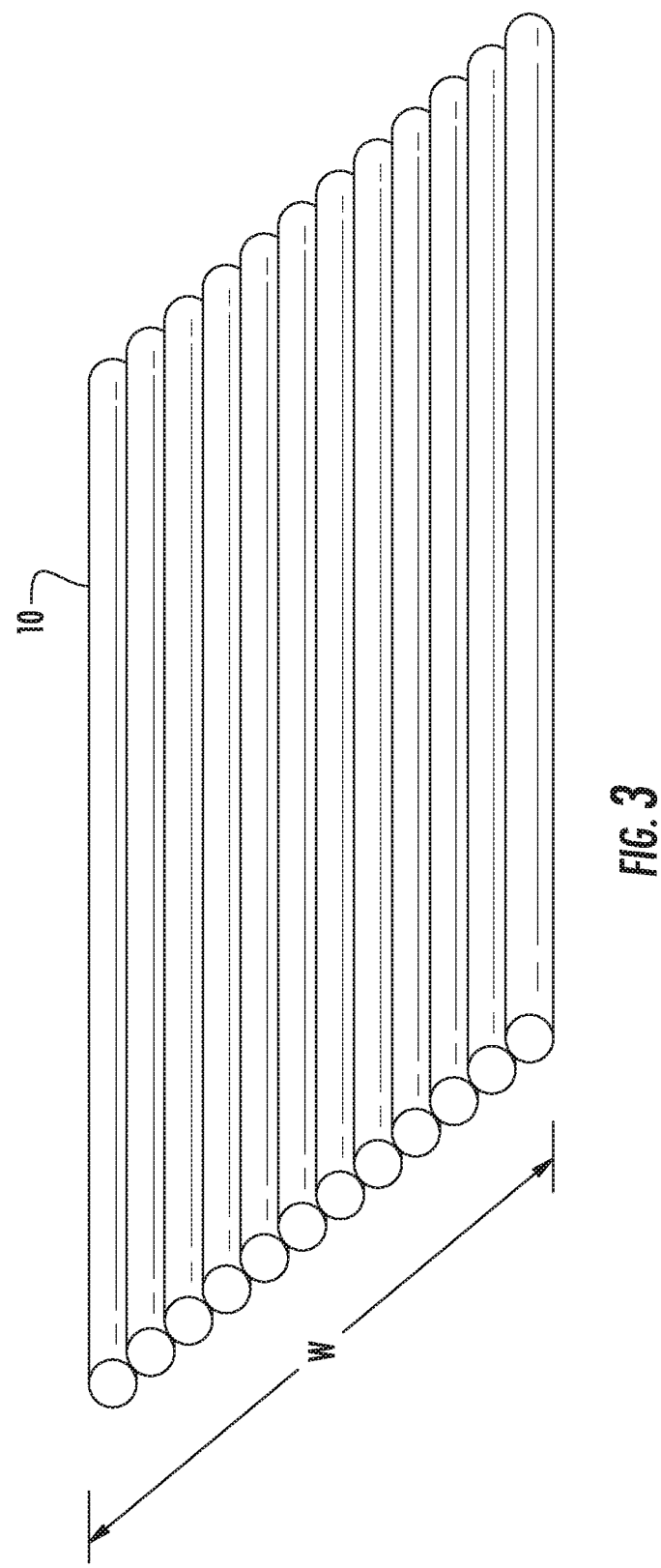
FIG. 3 depicts in a perspective view a representative optical-fiber assembly.

As depicted in FIGS. 3-4, an exemplary optical-fiber assembly 10 includes a plurality of optical fibers 11 arranged side-by-side such that the optical fibers 11 are substantially parallel to one another. Each optical fiber 11, which includes a component glass fiber 12 and one or more surrounding coating layers 13, may be closely spaced or contiguous with an adjacent optical fiber 11 but typically should not cross over one another along the length of the optical-fiber assembly 10. The optical-fiber assembly 10 (and the resulting optical-fiber ribbon) have a substantially planar (i.e., flattened) geometry that defines a relatively narrow height, a relatively wide width, and a substantially continuous length (e.g., over 1,000 meters, such as 5,000 meters or more).

As used herein, an optical-fiber assembly 10 as depicted in FIGS. 3-4 inherently defines an upper side (i.e., the top), a lower side (i.e., the bottom), a left edge, and a right edge. The respective upper and lower sides define the major surfaces of the optical-fiber assembly 10 (and the resulting optical-fiber ribbon). Those having ordinary skill in the art will appreciate that flipping the optical-fiber assembly 180 degrees over its major transverse axis will reverse the top and bottom, and so the terms can be used interchangeably herein depending on the frame of reference. Similarly, those having ordinary skill in the art will appreciate that yaw rotating the optical-fiber assembly 180 degrees will reverse the right edge and left edge, and so the terms can be used interchangeably herein depending on the frame of reference. Accordingly, as used herein, terms such as "first side" and "second, opposite side" refer to the respective upper and lower sides of the optical-fiber assembly 10 (and the resulting optical-fiber ribbon), or vice versa depending on the frame of reference.

As shown in FIGS. 3-4, the optical fibers 11 are arranged in parallel and respectively adjacent to each other in a plane. As such, the nominal width w of the optical-fiber assembly reflects the number n and diameter d of the optical fibers (i.e., w≅n×d). Typically, each optical fiber has a substantially circular cross section, and all of the optical fibers in an optical fiber ribbon have substantially the same nominal diameter. In an exemplary embodiment, the width w of the optical-fiber assembly is between about 2 millimeters and 10 millimeters (e.g., between 2 millimeters and 6 millimeters). In practice, the optical fibers are substantially contiguous to one another, although some small gaps may exist between adjacent optical fibers. The width of the resulting optical-fiber ribbon corresponds to the width w of the optical-fiber assembly. See FIG. 4.

In an exemplary embodiment, each optical fiber has a diameter d of between 240 micrometers and 260 micrometers, more typically about 250 micrometers. Alternatively, the optical fibers may have a reduced diameter d, such as between about 180 micrometers and 230 micrometers. In an exemplary embodiment, the optical-fiber assembly includes between six and 36 optical fibers (including 6 and 36), such as between 12 and 24 optical fibers (including 12 and 24).

During processing, the longitudinal optical-fiber assembly 10 advances at linear velocity v, typically at a linear speed greater than 150 meters per minute (e.g., greater than 200 meters per minute, such as greater than 300 meters per minute). In some exemplary embodiments, the longitudinal optical-fiber assembly 10 advances at linear velocity v between 400 and 700 meters per minute (e.g., between about 500 and 600 meters per minute). As the optical-fiber assembly 10 passes near (e.g., beneath) a dispenser unit 20, bonding material (e.g., a curable adhesive) is dispensed as an adhesive bead 15 via a dispensing nozzle 21 to a major surface of the optical-fiber assembly (e.g., its upper planar surface).

In an exemplary embodiment, the dispensing nozzle 21 revolves at a constant speed (i.e., a constant orbital angular velocity) around a central axis at a cyclical frequency r (i.e., the period to complete a revolution around the central axis). By controlling the relationship between linear velocity v of the optical-fiber assembly and the cyclical frequency r of the dispensing nozzle, a near sinusoidal pattern of bonding material (e.g., a substantially continuous adhesive bead 15) is achieved across a planar surface of the optical-fiber assembly. See FIG. 5.

Typically, the linear velocity v of the optical-fiber assembly and the cyclical frequency r of the dispensing nozzle are controlled to achieve a pitch v/r of at least about 50 millimeters, such as between 50 and 400 millimeters (e.g., between 75 and 300 millimeters). In another exemplary embodiment, the linear velocity v of the optical-fiber assembly and the cyclical frequency r of the dispensing nozzle are controlled to achieve a pitch v/r of between 90 and 110 millimeters, such as about 100 millimeters (e.g., 100 millimeters+/−0.2 millimeter). In this regard, pitch is the length of the recurring pattern of adhesive beads as applied to an optical-fiber assembly (e.g., the repeating length of a distorted sinusoidal pattern of deposited bonding material in the resulting optical-fiber ribbon). See FIG. 5.

Moreover, the ratio of pitch v/r to the width w of the optical-fiber assembly is typically at least 6 (e.g., at least 8), such as where the pitch v/r is at least 50 millimeters for a 24-count, optical-fiber assembly having a width w of about 6 millimeters. More typically, the ratio of pitch v/r to the width w of the optical-fiber assembly is at least about 12 and less than about 150 (e.g., about 15 or 20 or higher, such as between about 25 and 75). In an exemplary embodiment, the ratio of pitch v/r to the width w of the optical-fiber assembly is between about 30 and 40, such as for a 12-count optical-fiber assembly having a width w of about 3 millimeters.

In an alternative embodiment, the dispensing nozzle 21 revolves around a central axis at a variable speed (i.e., a variable orbital angular velocity) at a cyclical frequency r. In some instances, varying the orbital speed of the dispensing nozzle 21 may reduce the incidence of uneven bonding, such as can occur if the adhesive bead 15 forms an overly cycloid pattern (e.g., if the pitch v/r is relatively short). Revolving the dispensing nozzle 21 at variable orbital angular velocity can enhance the resulting distorted sinusoidal pattern (e.g., by reducing the cycloid-like nature of the adhesive bead) or can create rectilinear adhesive beads between adjacent optical fibers. For example, the orbital angular velocity may change when the dispensing nozzle 21 is positioned above an outer edge portion of the optical-fiber assembly 10 to modify the cycloidal transition (e.g., the orbital angular velocity could slow to elongate the valleys in the cycloid pattern and/or could increase to shorten the arced peak in the cycloid pattern), or the dispensing nozzle 21 may pause its circular orbit when positioned above grooves in the optical-fiber assembly 10 to form elongated, rectilinear adhesive beads. Similarly, the orbital angular velocity might slow across the central portion of the optical-fiber assembly 10 to create an ovaloid movement, which might achieve a different pattern for the sinusoidal deposition of adhesive. In an alternative embodiment, the circular orbit itself can be elongated (e.g., an elliptical orbit) to facilitate the deposition of an adhesive bead that is more sinusoidal and less cycloidal.

Typically, the central axis of the dispensing nozzle's orbit is centrally positioned above (or otherwise corresponding to) the midline (w/2) of the optical-fiber assembly (e.g., the central axis substantially intersects the middle longitudinal axis of the resulting optical-fiber ribbon). See FIG. 2. In this regard, for a 12-fiber ribbon the midline corresponds to the lengthwise groove between the sixth and seventh optical fibers, and for a 24-fiber ribbon the midline corresponds to the lengthwise groove between the twelfth and the thirteenth optical fibers. In an exemplary embodiment, the dispensing nozzle 21 revolves around a central axis in an orbit having a diameter that substantially corresponds to the width w of the longitudinal optical-fiber assembly 10. In this way, the bonding material is applied as an adhesive bead 15 across at least one major surface of the optical-fiber assembly (e.g., the upper planar surface). In a related embodiment, the dispenser nozzle 21 revolves around the central axis in an orbit having a diameter that substantially corresponds to the lateral distance (w−2d) between the two outermost optical fibers. As will be understood by those having ordinary skill in the art, this lateral distance (w−2d) is the separation between the outermost grooves in the optical-fiber assembly. See FIG. 2.

Typically, the adhesive bead bonding adjacent optical fibers in the optical-fiber assembly forms a distorted sinusoidal pattern across the width of the optical-fiber assembly, the distorted sinusoidal pattern having a peak-to-valley amplitude substantially between (i) the lateral distance between the two outermost optical fibers (w−2d) and (ii) the width w of the optical-fiber assembly.

As used herein, terms like "substantially corresponding to the width" and "substantially corresponding to the lateral distance" refer to the movement of a dispensing nozzle and/or the corresponding adhesive deposition patterns, which typically extend to the outermost, opposite optical fibers in the optical-fiber assembly (e.g., opposite edge portions of the optical-fiber assembly).

It is within the scope of the present disclosure to have either one substantially continuous adhesive bead or a series of discontinuous beads that secure (e.g., affix) the optical fibers within the optical-fiber ribbon. In an exemplary embodiment, the adhesive bead(s) are arranged on only one side of the optical-fiber assembly (i.e., a first side). For example, the bead(s) are arranged only on one major surface of the optical-fiber assembly, typically its upper surface (i.e., when the optical fibers are arranged in a ribbon-like manner rather than rolled up). As noted, the optical-fiber assembly can be viewed as a ribbon-like assembly defining an upper surface, a lower surface, and two side edges. The upper and lower surfaces (i.e., the respective major surfaces) are not completely flat, because they are formed of a substantially parallel arrangement of optical fibers. As such, the upper and lower surfaces have parallel longitudinal grooves between adjacent optical fibers. Those having ordinary skill in the art will understand the optical fibers may not be perfectly parallel but rather substantially parallel in practice.

The adhesive beads typically follow a distorted sinusoidal pattern to bond adjacent optical fibers within the optical-fiber ribbon. In some exemplary embodiments, the dispensing nozzle may pause its orbit when positioned above grooves in the optical-fiber assembly to deposit bonding material as longitudinal, rectilinear adhesive beads with the respective grooves. In an exemplary embodiment, the adhesive bead forms a kind of thread having a mass (in grams) per 10,000 meters of between 60 and 120 dtex, such as between 75 and 110 dtex.

It has been observed that, in accordance with the present disclosure, dispensing bonding material from a nozzle that is revolving in a plane parallel to a planar optical-fiber assembly facilitates faster line speeds during the manufacturing of an intermittently bonded optical-fiber ribbon. In this regard, an exemplary dispensing nozzle is made of a capillary tube at the center of a metallic sleeve that is revolving in a substantially circular orbit via a servomotor (e.g., using belt-pulley system). Such a configuration reduces undesirable vibrations, which can be caused by the linear motion of a conventional reciprocating crank shaft as typically used with reciprocating nozzles, and avoids overlapping and/or uneven distribution of bonding material, which can occur using a conventional reciprocating crank shaft. Indeed, it has been observed that the use of a revolving nozzle as herein disclosed helps to achieve linear velocities v between 400 and 700 meters per minute, which is about 4-5 times greater than is possible with a conventional reciprocating-crank-shaft system.

As noted, in an exemplary embodiment, the linear velocity v of the optical-fiber assembly and the cyclical frequency r of the dispensing nozzle are controlled to achieve a pitch v/r of about 100 millimeters (e.g., 100 millimeters+/−0.2 millimeter). It has been observed that this pitch achieves a near sinusoidal pattern substantially across the width of a 24-count optical-fiber assembly having a width w of about 6 millimeters (e.g., on a planar side of the optical-fiber ribbon, a bead extending from one edge portion to the opposite edge portion and repeating itself along the length of the optical-fiber assembly). In this regard, the use of this kind of revolving nozzle yields a distorted sinusoidal pattern that repeatedly forms (i) peaks at one edge portion of the optical-fiber assembly and (ii) valleys at an opposite edge portion of the optical-fiber assembly, and wherein the distorted sinusoidal peaks and the distorted sinusoidal valleys have different respective shapes. It has been observed that a higher ratio of pitch v/r to width w of the optical-fiber assembly, such as between about 30 and 35 for a 12-count optical-fiber assembly having a width w of about 3 millimeters, achieves a near sinusoidal shape with tolerable distortion between peaks and valleys.

As used herein, the term "substantially across the width" and the like refer to adhesive deposition patterns along the optical-fiber assembly that extend to the outermost, opposite optical fibers in the optical-fiber assembly. As will be understood by those having ordinary skill in the art, providing an adhesive bead "substantially across the width" of the optical-fiber assembly bonds adjacent optical fibers to achieve an optical-fiber ribbon.

It has been observed that lower ratios of pitch v/r to width w yield adhesive bead deposition in an undesirable cycloid pattern. For instance, if the pitch v/r is too short (e.g., less than 50 millimeters or so for a 12-count optical-fiber assembly), the revolving nozzle yields an undesirable cycloid pattern. An overly cycloid bonding pattern creates uneven adhesive bonds between optical fibers (e.g., more bonding at one edge portion of the optical-fiber ribbon than the other edge portion), and the resulting optical-fiber ribbon becomes too rigid, hindering optimal folding in space (e.g., three-axes folding).

Without being bound to any theory, the following analysis provides additional insight into achieving a favorable, distorted sinusoidal pattern of an adhesive bead via a revolving nozzle:

The deposition pattern from the nozzle, which revolves at a constant orbital angular velocity around a central axis at a cyclical frequency r, onto the longitudinal optical-fiber assembly, which advances at linear velocity v, depends on two different movements. The equations for the revolving nozzle are as follows:

$$x''(t) = A \cdot \sin(t^* \omega)$$

$$y''(t) = A \cdot \cos(t^* \omega)$$

where A is the radius of the revolving nozzle's circular orbit around a central axis (referred to herein as the "eccentricity").

The linear movement of the longitudinal optical-fiber assembly should also be considered:

$$x'(t) = v^* t$$

The resulting shape of the adhesive bead dispensed upon the optical-fiber assembly is the superposition of these components:

$$x(t) = x'' + x' = A \cdot \sin(t \cdot \omega) + v \cdot t$$

$$y(t) = x'' = A \cdot \cos(t \cdot \omega)$$

So, the advancement of the optical-fiber assembly impacts only the X component of the shape. The speed of the revolving nozzle must be linked to the linear velocity v of the optical-fiber assembly, and this is achieved by introducing ribbon pitch P, the length of optical-fiber ribbon corresponding to a full nozzle rotation (i.e., P=v/r). By using this relationship, the nozzle's required angular velocity can be derived from the optical-fiber assembly's linear velocity v (e.g., calculating angular velocity as a function of line speed) as follows:

$$x(t) = A \cdot \sin\left(t \cdot 2\pi \frac{v}{P}\right) + v \cdot t$$

$$y(t) = A \cdot \cos\left(t \cdot 2\pi \frac{v}{P}\right)$$

Furthermore, by synchronizing the linear velocity v of the optical-fiber assembly and the cyclical frequency r of the dispensing nozzle, the time domain can shift to the space domain using the optical-fiber ribbon length L (i.e., by substituting for v·t):

$$x(r) = A \cdot \sin\left(L \cdot \frac{2\pi}{P}\right) + L$$

$$y(r) = A \cdot \cos\left(L \cdot \frac{2\pi}{P}\right)$$

These equations (above) can be used to plot the bead shape for different ribbon pitch lengths (P) as deposited on the optical-fiber ribbon. The respective bead shapes are maintained regardless of the linear velocity v of the optical-fiber assembly, provided the synchronization system is implemented. In sum, the angular velocity of the revolving nozzle is synchronized with the linear velocity v of the optical-fiber assembly not only during steady-state operations but also during ramp up and ramp down (i.e., startup and shutdown).

It would be desirable to achieve a pure sine deposition shape on the optical-fiber ribbon. This would entail only a sine function (or a cosine function) on the Y and only ribbon advancement on the X. However, there is a sine function on the X, which causes a distorted sine deposition shape on the optical-fiber ribbon. To evaluate the magnitude of the distortion, one can calculate the distortion ratio k between the horizontal oscillation of the nozzle (i.e., the orbital diameter) and the length of optical-fiber assembly corresponding to this oscillation (i.e., a half pitch, namely P/2=v/2r). The lower the distortion ratio k, the closer the deposition shape will be to a pure sine deposition shape.

The horizontal oscillation of the nozzle is two times the eccentricity A (i.e., A is the radius of the revolving-nozzle orbit around a central axis). The sine function goes from its maximum to its minimum in a half rotation, so the length of optical-fiber assembly corresponding to this nozzle oscillation is a half pitch (i.e., P/2=v/2r). Accordingly, the distortion ratio k is defined as follows:

$$k = \frac{2A}{P/2} = \frac{4A}{P}$$

Table 1 (below) provides the distortion ratio k for various ribbon pitches with respect to a dispensing nozzle having a 1.5-millimeter orbital radius as measured from the central axis:

TABLE 1

| pitch (millimeters) | distortion ratio k |
|---|---|
| 10 | 60% |
| 20 | 30% |
| 30 | 20% |
| 50 | 12% |
| 75 | 8% |
| 100 | 6% |
| 200 | 3% |
| 400 | 1.5% |

Table 2 (below) provides the distortion ratio k for various ribbon pitches with respect to a dispensing nozzle having a 3.0-millimeter orbital radius as measured from the central axis:

TABLE 2

| pitch (millimeters) | distortion ratio k |
|---|---|
| 10 | 120% |
| 20 | 60% |
| 30 | 40% |
| 50 | 24% |
| 75 | 16% |
| 100 | 12% |
| 200 | 6% |
| 400 | 3% |

In an exemplary embodiment, the bonding material that forms an adhesive bead is applied with a viscosity of between 100 cP and 1000 cP, typically between 100 cP and 400 cP. This allows a sufficient viscous mass to fill the grooves between adjacent optical fibers and will yield (e.g., after curing) an optical-fiber ribbon having a smoother ribbon bead, thereby reducing possible stresses in the optical-fiber ribbon when rolled or folded. If the viscosity is too low, the material is too thin and runny, and the adhesive will excessively flow between the optical fibers and not form a consistent bond. The viscosity can be measured using a Brookfield digital rotational viscometer Model DV-II with RV1 spindle at 10 rpm. The viscosity can be measured at several different temperatures, such as at 23° C., and/or at 30° C., and/or at 40° C., and/or at 50° C., and/or at 60° C., to determine the optimal temperature for the application of the bonding material (e.g., a curable resin material).

In an exemplary embodiment, the bonding material that forms an adhesive bead is heated and applied at a temperature of up to 60° C. (e.g., between about 23° C. and 60° C.). If higher temperatures are used during the preparation of the optical-fiber ribbons, thermal stress might occur in the optical fibers, leading to attenuation (e.g., at a wavelength of 1310 nanometers, 1550 nanometers, and/or 1625 nanometers).

In an exemplary embodiment, the dispensing nozzle may deliver liquid bonding material in fine droplets to the advancing optical-fiber assembly. Because of surface tension, the liquid bonding material—if provided in sufficient droplets at a sufficient frequency will flow together to form substantially continuous adhesive beads.

With respect to the method of producing an optical-fiber ribbon, each optical fiber 11 that is arranged into longitudinal optical-fiber assembly 10 includes, from its center to its periphery, a glass core, a glass cladding, and one or more coatings, such as a primary coating, a secondary coating, and an optional ink layer (e.g., an ink layer contiguously surrounding the secondary coating). Those having ordinary skill in the art will understand the different kinds of primary coatings, secondary coatings, and ink layers, as well as the structures and thicknesses thereof. This application hereby incorporates by reference commonly owned U.S. Pat. No. 8,265,442 for a Microbend-Resistant Optical Fiber and U.S. Pat. No. 8,600,206 for a Reduced-Diameter Optical Fiber.

In an exemplary embodiment, each optical fiber 11 also includes a sacrificial outer layer that facilitates the separation of an optical fiber from the optical-fiber ribbon without damaging the optical fiber's principal structural parts. Accordingly, this application hereby incorporates by reference commonly owned U.S. Patent Application Publication No. US 2019/0250347 A1, which discloses the use of sacrificial outer release layers (e.g., employing first and second curable resins, such as curable ultraviolet resins) in optical-fiber ribbons.

In an exemplary embodiment, the sacrificial outer layer of the plurality of optical fibers includes a partly cured first curable resin. For example, before advancing (or otherwise arranging) the plurality of optical fibers to provide a longitudinal optical-fiber assembly, a first curable resin of the outer layer of each of the plurality of optical fibers is partly cured to a surface curing degree of between 85 percent and 95 percent, such as between 88 percent and 92 percent (e.g., about 90 percent cured), to provide optical fibers having an outer layer of a partly cured first curable resin.

In other exemplary embodiments, the sacrificial outer layer of the plurality of optical fibers includes a substantially fully cured first curable resin. For example, before feeding (or otherwise arranging) the plurality of optical fibers to provide a longitudinal optical-fiber assembly, a first curable resin of the outer layer of each of the plurality of optical fibers is substantially fully cured to a surface curing degree of 95 percent or more to provide optical fibers having an outer layer of a substantially fully cured first curable resin.

In alternative exemplary embodiments, the sacrificial outer layer of the plurality of optical fibers includes a completely cured first curable resin.

In an exemplary embodiment, the thickness of the outer layer (i.e., the sacrificial release layer formed by the first curable resin as cured) is between 2 micrometers and 10 micrometers, such as between 3 micrometers and 5 micrometers or, more typically, between 5 micrometers and 10 micrometers. In another exemplary embodiment, the sacrificial outer layer itself may constitute an ink layer.

Typically, if the optical fibers 11 include a sacrificial outer layer formed of a first curable resin, the bonding material is a second curable resin, and the dispensing nozzle 21 thus dispenses a second curable resin (e.g., a curable adhesive) onto the first curable resin that forms a sacrificial outer layer of the optical fibers (and thus of the optical-fiber assembly, too). Thereafter, the optical-fiber assembly with an adhesive bead, which forms a distorted sinusoidal pattern substantially across the width of the optical-fiber assembly, is passed through a curing station 22 for curing the second curable resin and, if the first curable resin is less than completely cured (e.g., partly cured or substantially fully cured) to further cure the first curable resin. See FIG. 1. As noted, the distorted sinusoidal pattern typically repeats itself along the length of the optical-fiber assembly. For example, an exemplary curing station 22 may emit ultraviolet (UV) radiation for curing the adhesive beads of the second curable resin and for further curing the partly cured first curable resin (or the substantially fully cured first curable resin) for the outer layer of the optical fibers. In some embodiments, a connection (e.g., a chemical coupling, such as via covalent bonds) is created between the first curable resin, which is the sacrificial outermost coating layer of the optical fibers, and the second curable resin, which is typically applied to the optical-fiber assembly as one or more adhesive beads.

By way of non-limiting illustration, where the first curable resin is partly cured, the concurrent curing of the first curable resin and the second curable resin provides increased bonding strength between the second curable resin and the optical fibers' first curable resin. Conversely, where the first curable resin is substantially fully cured such that little further curing is possible, the subsequent curing of the second curable resin provides decreased bonding strength between the second curable resin and the optical fibers' first curable resin. The relative strength of the coupling between the first curable resin and the second curable resin affects the robustness of the optical-fiber ribbon and the ease by which optical fibers can be separated from the optical-fiber ribbon.

Curing the partly cured first curable resin (or the substantially fully cured first curable resin) that forms the optical fiber's outer layer to the second curable resin that forms the bead seems to affect optical-fiber-ribbon robustness and ease of optical-fiber separation from the optical-fiber ribbon. In the resulting optical-fiber ribbon, the point of failure when removing an optical fiber preferably occurs (i) within the adhesive bead (i.e., formed by the second curable resin as cured), (ii) at the interface between the adhesive bead (i.e., formed by the second curable resin as cured) and the sacrificial outer layer (i.e., formed by the first curable resin as cured), (iii) within the sacrificial outer layer itself (i.e., formed by the first curable resin as cured), or (iv) at the interface between the sacrificial outer layer (i.e., formed by the first curable resin as cured) and the secondary coating layer (or the optional ink layer, if present). As noted, the outer layer of the optical fiber (i.e., formed by the first curable resin as cured) can be considered a sacrificial release layer that facilitates the separation of an optical fiber from the optical-fiber ribbon without damaging the optical fiber's principal structural parts, namely the glass core, the glass cladding, the primary coating, the secondary coating, and the optional ink layer, if present.

When an optical fiber is to be peeled or otherwise removed from the optical-fiber ribbon, no damage ought to occur to the principal structure of the optical fibers. To maintain the integrity of the optical fiber, it would be undesirable if the point of failure or rupture during optical-fiber peel-off were to occur, for example, within the optional ink layer, the secondary coating, or at the secondary coating's interface with the primary coating. This kind of peel-off failure could be considered unacceptable damage to the optical fiber.

The optical-fiber ribbon according to the present invention may be used to form optical-fiber-cable units and optical-fiber cables. An exemplary optical-fiber-cable unit has 24 ribbons of 12 optical fibers each. Such an optical-fiber-cable unit packs 288 optical fibers into a high optical-fiber density. Accordingly, in another inventive aspect, the present invention embraces an optical-fiber-cable unit including one or more optical-fiber ribbons (also according to the present invention) surrounded by a polymeric sheath. The present invention further embraces an optical-fiber cable including one or more of the optical-fiber ribbons or optical-fiber-cable units according to the present invention.

To supplement the present disclosure, this application incorporates entirely by reference the following commonly assigned patents, patent application publications, and patent applications: U.S. Pat. No. 7,623,747 for a Single Mode Optical Fiber; U.S. Pat. No. 7,889,960 for a Bend-Insensitive Single-Mode Optical Fiber; U.S. Pat. No. 8,145,025 for a Single-Mode Optical Fiber Having Reduced Bending Losses; U.S. Pat. No. 8,265,442 for a Microbend-Resistant Optical Fiber; U.S. Pat. No. 8,600,206 for a Reduced-Diameter Optical Fiber; U.S. Pat. No. 10,185,105 for a Flexible Optical-Fiber Ribbon; International Publication No. WO 2019/011417 A1 (published Jan. 17, 2019); International Publication No. WO 2019/011418 A1 (published Jan. 17, 2019); International Publication No. WO 2019/137627 A1 (published Jul. 18, 2019); and International Publication No. WO 2019/137628 A1 (published Jul. 18, 2019).

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A method of making an optical-fiber ribbon, comprising:
   (i) arranging a plurality of optical fibers into a longitudinal optical-fiber assembly having width w, wherein the plurality of optical fibers are parallel and respectively adjacent to each other;
   (ii) advancing the longitudinal optical-fiber assembly at linear velocity v; and
   (iii) applying bonding material to a surface of the optical-fiber assembly via a dispenser that is revolving around a central axis at a cyclical frequency r, wherein pitch v/r is 50 millimeters or greater.

2. The method according to claim 1, comprising continuously applying bonding material to a surface of the optical-fiber assembly via a dispensing nozzle while the dispensing nozzle revolves around a central axis that is centrally positioned to substantially intersect midline (w/2) of the optical-fiber assembly.

3. The method according to claim 2, wherein the longitudinal optical-fiber assembly includes two outermost optical fibers having diameter d, and wherein the dispenser revolves around the central axis in a circular orbit having a diameter inclusively between (i) the lateral distance between the two outermost optical fibers (w−2d) and (ii) the width w of the longitudinal optical-fiber assembly.

4. The method according to claim 1, wherein the pitch v/r is between 75 millimeters and 300 millimeters.

5. The method according to claim 1, wherein the pitch v/r is between 100 millimeters and 200 millimeters.

6. The method according to claim 1, wherein the pitch v/r is between 90 millimeters and 110 millimeters.

7. The method according to claim 1, wherein the longitudinal optical-fiber assembly advances at linear velocity v of at least 200 meters per minute.

8. The method according to claim 1, wherein the longitudinal optical-fiber assembly advances at linear velocity v of between 400 meters per minute and 700 meters per minute.

9. The method according to claim 1, wherein the ratio of the pitch v/r to the width w of the optical-fiber assembly is at least 8.

10. The method according to claim 1, wherein the ratio of the pitch v/r to the width w of the optical-fiber assembly is between 12 and 150.

11. A method of making an optical-fiber ribbon, comprising:
    (i) arranging a plurality of optical fibers into a longitudinal optical-fiber assembly having planar width w, a first major surface, and a second major surface, wherein the plurality of optical fibers are parallel and respectively adjacent to each other;

(ii) continuously advancing the plurality of optical fibers as arranged in the longitudinal optical-fiber assembly at linear velocity v; and (iii) applying bonding material to at least one major surface of the optical-fiber assembly via a dispensing nozzle that is revolving around a central axis at a cyclical frequency r, wherein the ratio of pitch v/r to the width w of the optical-fiber assembly is between 12 and 150.

12. The method according to claim 11, wherein the pitch v/r is between 50 millimeters and 400 millimeters.

13. The method according to claim 11, wherein the longitudinal optical-fiber assembly advances at linear velocity v of at least 300 meters per minute.

14. An optical-fiber ribbon, comprising:
(i) a plurality of respectively adjacent optical fibers extending in a longitudinal direction and arranged in parallel to form an optical-fiber assembly having width w; and
(ii) an adhesive bead bonding adjacent optical fibers in the optical-fiber assembly, the adhesive bead forming a distorted sinusoidal pattern across the width of the optical-fiber assembly, wherein the adhesive bead's distorted sinusoidal pattern repeatedly forms (i) peaks at one edge portion of the optical-fiber assembly and (ii) valleys at an opposite edge portion of the optical-fiber assembly, and wherein the distorted sinusoidal peaks and the distorted sinusoidal valleys have different respective shapes.

15. The optical-fiber ribbon according to claim 14, wherein each optical fiber includes, from its center to its periphery, a glass core, a glass cladding, a primary coating, and a secondary coating.

16. The optical-fiber ribbon according to claim 14, wherein each optical fiber includes, from its center to its periphery, a glass core, a glass cladding, a primary coating, a secondary coating, and an outer layer formed of a cured first curable resin, wherein the adhesive bead is a cured second curable resin that is chemically coupled to the cured first curable resin of respective, adjacent optical fibers.

17. The optical-fiber ribbon according to claim 14, wherein the distorted sinusoidal pattern has a pitch of between 50 millimeters and 400 millimeters.

18. The optical-fiber ribbon according to claim 14, wherein the adhesive bead intermittently bonds adjacent optical fibers in the optical-fiber assembly.

19. The optical-fiber ribbon according to claim 14, wherein the longitudinal optical-fiber assembly includes two outermost optical fibers having diameter d, and wherein the adhesive bead forming a distorted sinusoidal pattern has a peak-to-valley amplitude substantially between (i) the lateral distance between the two outermost optical fibers (w−2d) and (ii) the width w of the optical-fiber assembly.

20. The optical-fiber ribbon according to claim 14, wherein:
the adhesive bead's distorted sinusoidal pattern has a ribbon pitch (P); and
the ratio of ribbon pitch P to the width w of the optical-fiber assembly is at least 8.

21. The optical-fiber ribbon according to claim 14, wherein:
the adhesive bead's distorted sinusoidal pattern has a ribbon pitch (P); and
the ratio of ribbon pitch P to the width w of the optical-fiber assembly is between 12 and 150.

22. An optical-fiber-cable unit comprising one or more optical-fiber ribbons according to claim 14.

* * * * *